May 24, 1955   F. J. SCHENKELBERGER   2,709,016
LOAD GRIPPER AND CARRIER FOR AN INDUSTRIAL LIFT TRUCK
Filed Aug. 7, 1952   6 Sheets-Sheet 1

INVENTOR.
FRANK J. SCHENKELBERGER
BY
Geo. B. Pitts
ATTORNEY

INVENTOR.
FRANK J. SCHENKELBERGER

May 24, 1955   F. J. SCHENKELBERGER   2,709,016
LOAD GRIPPER AND CARRIER FOR AN INDUSTRIAL LIFT TRUCK
Filed Aug. 7, 1952   6 Sheets-Sheet 4
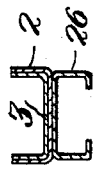
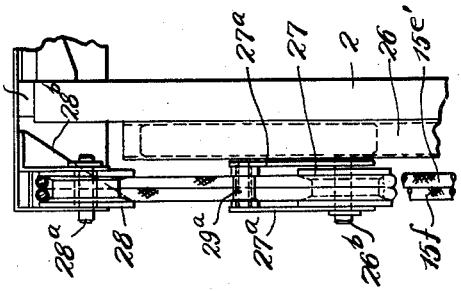
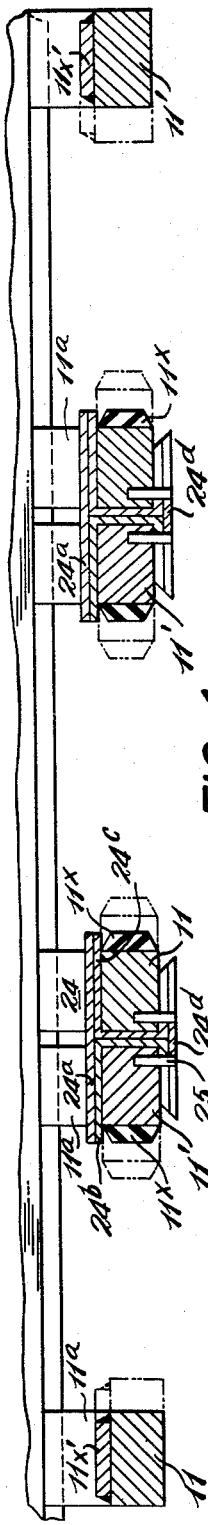
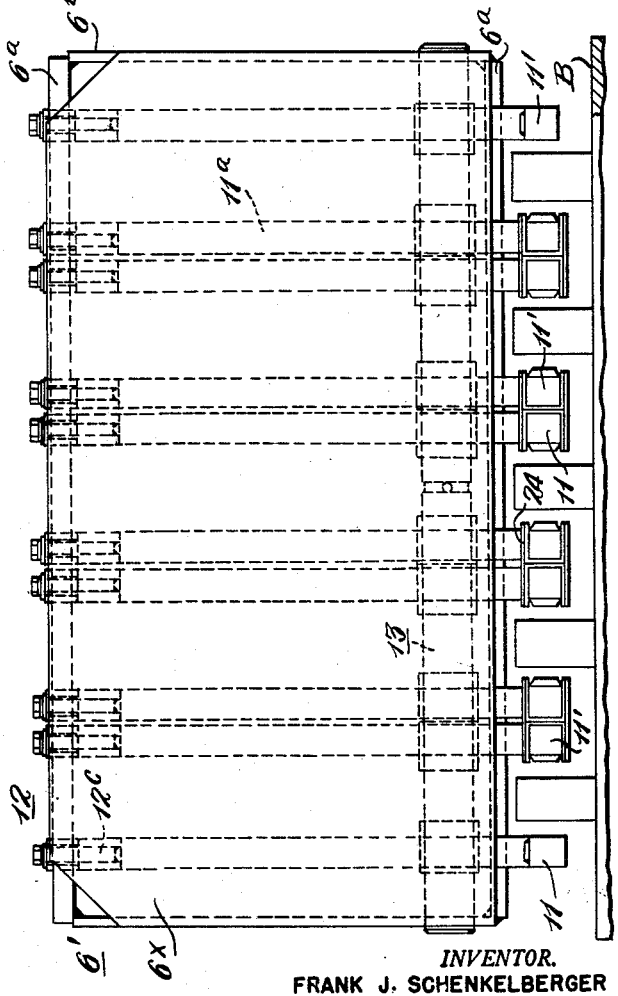
INVENTOR.
FRANK J. SCHENKELBERGER
BY
*Geo. B. Pitts*
ATTORNEY May 24, 1955  F. J. SCHENKELBERGER  2,709,016
LOAD GRIPPER AND CARRIER FOR AN INDUSTRIAL LIFT TRUCK
Filed Aug. 7, 1952  6 Sheets—Sheet 5
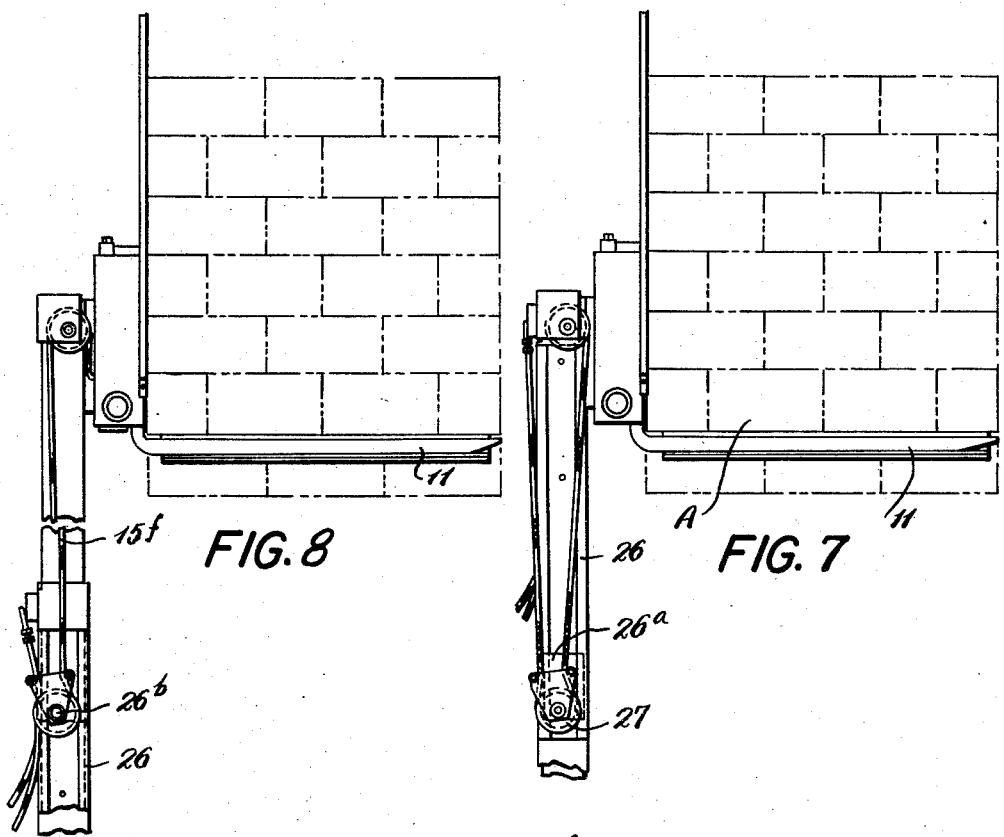
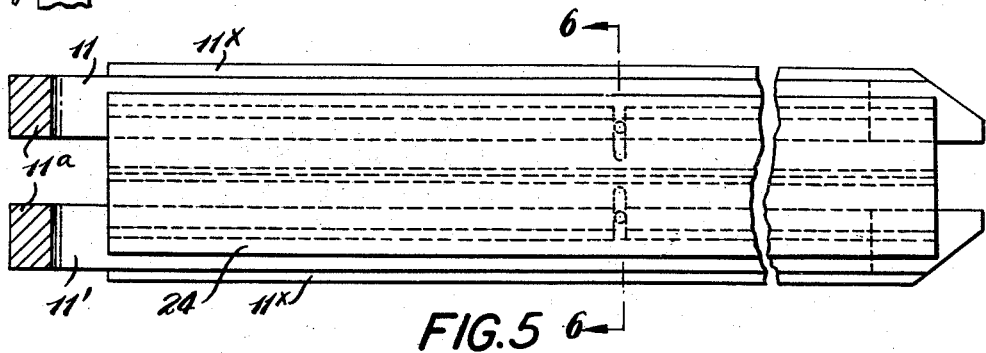
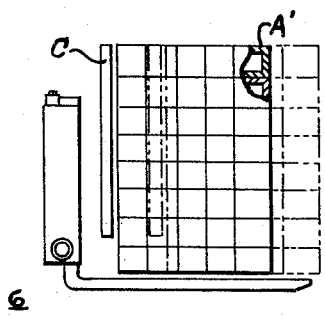
INVENTOR.
FRANK J. SCHENKELBERGER
BY
Geo. B. Pitts
ATTORNEY May 24, 1955  F. J. SCHENKELBERGER  2,709,016
LOAD GRIPPER AND CARRIER FOR AN INDUSTRIAL LIFT TRUCK
Filed Aug. 7, 1952  6 Sheets-Sheet 6

INVENTOR.
FRANK J. SCHENKELBERGER
BY Geo. B. Pitts
ATTORNEY

United States Patent Office 2,709,016
Patented May 24, 1955

2,709,016

LOAD GRIPPER AND CARRIER FOR AN INDUSTRIAL LIFT TRUCK

Frank J. Schenkelberger, North Olmsted, Ohio, assignor to The Baker-Raulang Company, Cleveland, Ohio, a corporation of Ohio Application August 7, 1952, Serial No. 303,078

9 Claims. (Cl. 214—655)

This invention relates to a system for handling loads and to an industrial elevating truck having a load carrier adapted to pick up, transport and discharge loads in a rapid and efficient manner, whereby economical results are attained; more particularly the invention involves an improved (a) carrier supported on the elevating member of the truck and provided with pairs of relatively movable members adapted to engage and raise loads of various types, including pre-grouped or pre-assembled bodies, which may be transported and discharged as a unit and (b) a system for handling and discharging loads of the types referred to. For the purpose of illustration, the bodies may consist of bags and other bodies, cartons, boxes, molded blocks, tiles, bricks and the like, which, following shaping or molding thereof, are grouped or assembled in stacked relation, forming separate loads of a desired size for transportation and discharge in freight cars, cargo planes, trucks or trailers, or places of storage.

In some instances, certain of the bodies are first or initially disposed in spaced relation in rows and then other bodies are mounted on the spaced bodies in grouped or assembled relation to complete a load of the desired size or weight. In such pre-grouping or pre-assembly of the bodies, the movable members operate, as later set forth, to engage under pressure the sides of the initially positioned bodies, respectively, so that upon raising of the elevating member, the pre-grouped or pre-assembled bodies may be raised and transported as a unit. In other instances, the bodies are positioned on suitable supports parts of which are engaged under pressure by lateral movement of the movable members, whereby the support and bodies thereon may be raised and transported.

The invention includes a plurality of movable members operated by a fluid pressure supply means and adapted to yieldably engage the walls of the load and auxiliary pressure means to compensate for leakage of the fluid in the fluid pressure supply system.

The invention includes sets of movable members for engaging parts of a load and means for simultaneously moving the corresponding members thereof, so that the pressure effected by the respective members is substantially the same on all parts of the load engaged thereby.

One object of the invention is to provide, in an industrial elevating truck, an improved load carrier having a plurality of power operated, laterally movable members adapted to engage under pressure the sides of spaced walls, respectively, of a load to raise the latter.

Another object of the invention is to provide, in an industrial elevating truck, an improved carrier having pairs of relatively movable load engaging members and mechanism for simultaneously moving the respective corresponding members of the pairs of members toward or from each other to engage respectively parts of the load.

Another object of the invention is to provide an improved carrier adapted to be mounted on the elevating member of a truck and provided with load engaging members for raising and transporting a load mounted on a support and operable to raise the support and load thereon and transport them and thereafter raise and transport the load independently of the support.

Another object of the invention is to provide, in an industrial elevating truck, an improved load carrier mounted on the elevating member of the truck and consisting of a pair of fluid pressure operated, relatively movable members arranged to engage under pressure the sides of a load and auxiliary pressure means for compensating for leakage in the fluid pressure supply system.

A further object of the invention is to provide, in an industrial elevating truck, an improved load carrier having relatively movable load engaging members, a power operated device to which each member is detachably connected, whereby the members may be predeterminately spaced for movement toward and from each other.

A further object of the invention is to provide, in an elevating truck, an improved load carrier having a plurality of outwardly extending, relatively movable elongated load members arranged to be moved laterally into pressure engagement with the sides of a load, the sides of the members being provided with yieldable material which is compressed by the pressure engaging action of the members to insure a positive engagement of the latter with the load.

A further object of the invention is to provide an improved process or system of handling loads wherein the load is initially positioned on a support, the latter with the load thereon is then engaged by the load engaging members of the carrier, then the support and load as a unit are raised and transported to a designated location, then the support and load as a unit are lowered to engage the support of the floor or other surface, then the load engaging members are disengaged from the support, then the load is raised from the support and finally the load is transported to a desired location and discharged.

Other objects of the invention will be apparent to those skilled in the art to which my invention relates from the following description taken in connection with the accompanying drawings, wherein Fig. 1 is a fragmentary side elevation of an industrial elevating truck, provided with a load carrier embodying my invention;

Fig. 4 is a fragmentary view, partly in elevation on the line 2—2 and partly in section on the line 4—4 of Fig. 1, the load engaging members being in inoperative position;

Fig. 5 is a section on the line 5—5 of Fig. 3;

Fig. 6 is a section on the line 6—6 of Fig. 5;

Fig. 6a is a section on the line 6a—6a of Fig. 3;

Fig. 7 is a fragmentary side elevation showing the position of certain parts when the carrier is raised to the limit of its movement relative to the guides for the elevating member;

Fig. 8 is a view similar to Fig. 7, but showing the position of certain parts when the carrier is raised to a higher level;

Fig. 9d is a diagrammatic view showing a pusher to discharge the load;

Figs. 10, 10a, 10b and 10c are diagrammatic views similar to Figs. 9, 9a, 9b and 9c, respectively, but showing the employment of a different form of support; and Figs. 11, 11a, 11b and 11c are diagrammatic views similar to Figs. 9, 9a, 9b and 9c, respectively, but showing the employment of another form of support; and Fig. 12 illustrates a modified form of carrier.

Figure 1:
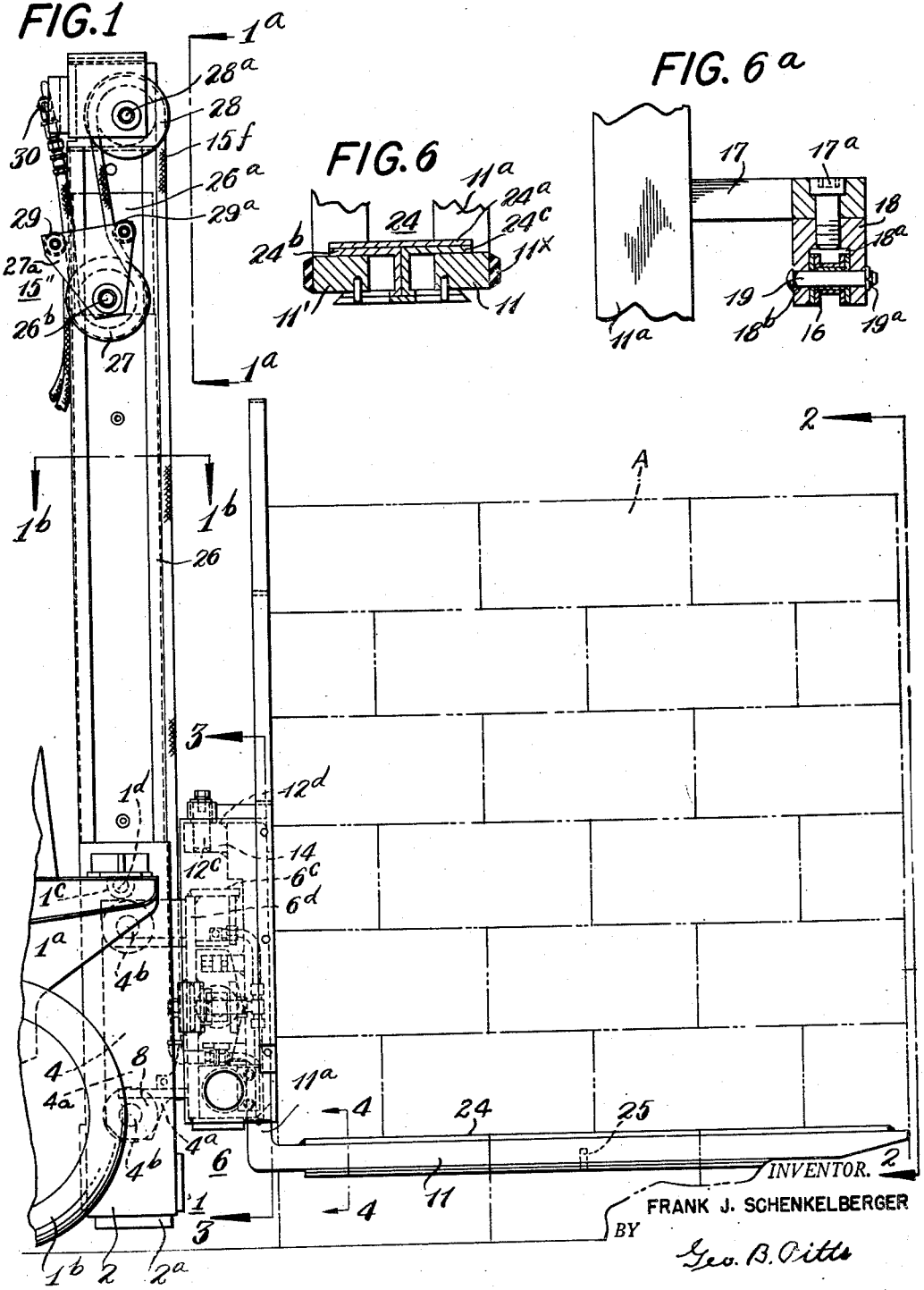
Fig. 1a is a fragmentary elevation on the line 1a—1a of Fig. 1.
Fig. 1b is a section on the line 1b—1b of Fig. 1.
Figure 2:
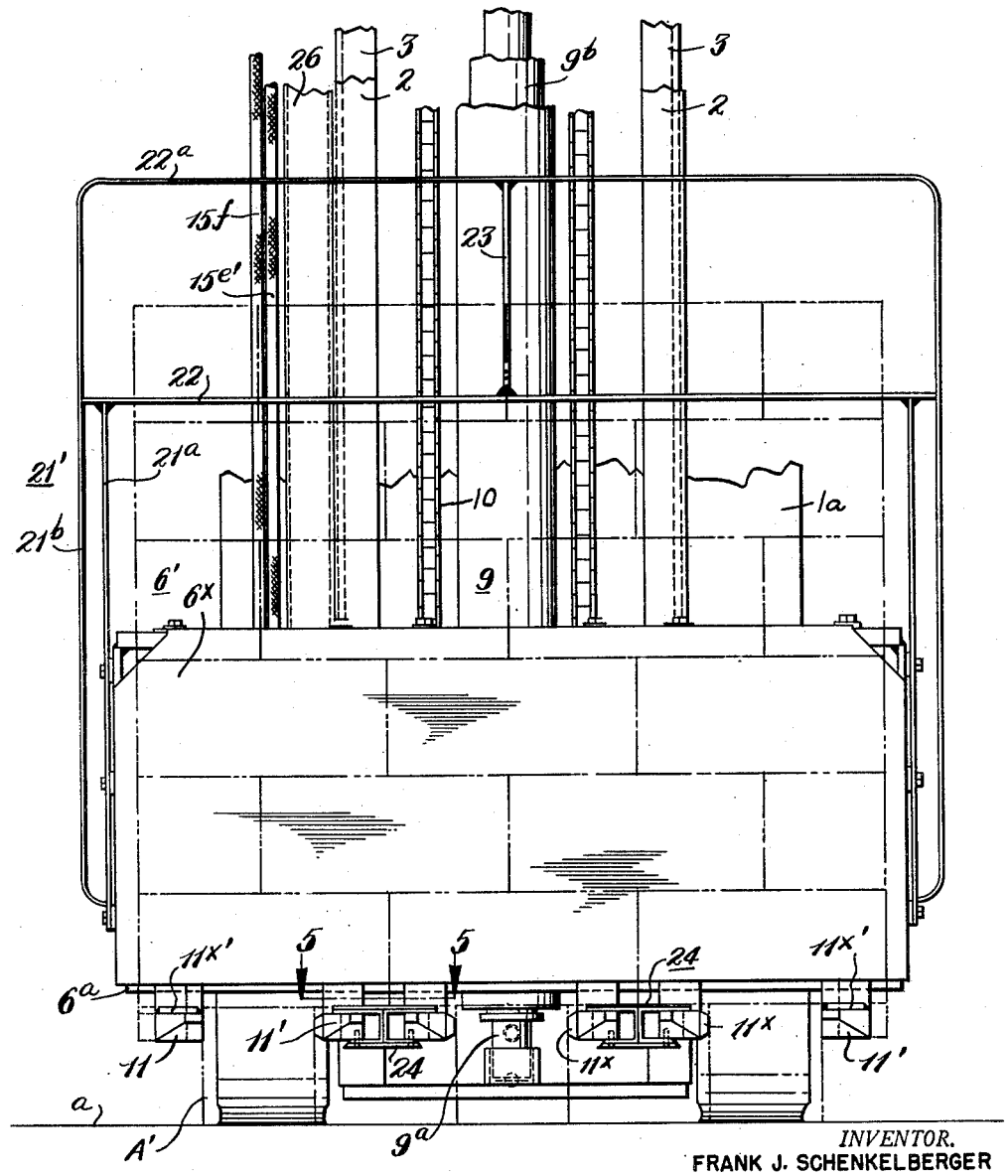
Fig. 2 is a fragmentary front elevation (looking toward the left) of parts shown in Fig. 1.

In the drawings (referring particularly to Figs. 1 to 8, inclusive), 1 indicates as an entirety the front portion of an industrial elevating truck consisting of a frame 1a mounted on a pair of front wheels 1b and a pair of rear wheels (not shown). By preference, one of said pairs of wheels is driven by a suitable motive power and the wheels of the other pair are mounted to provide for steering of the truck. The frame 1a is provided at its front end with extensions having bearings 1c for trunnions 1d, which are secured to and extend laterally from a pair of spaced main guides 2, the latter being connected together at their lower ends by a base 2a. The trunnions 1d permit the guides 2 and parts supported thereon to swing or tilt inwardly to facilitate transportation of the loads. Such mounting of the main guides 2 and the mechanism for tilting or swinging them inwardly and outwardly are well known in this art, for which reason such mechanism is not shown. The guides 2 slidably support a pair of secondary guides 3, for movement endwise thereon and the latter guides slidably support an elevating member, indicated as an entirety at 4. As shown in Fig. 1, the guides 2 and 3 are preferably of equal length and in the lowest position of the elevating member 4 (see Figs. 1 and 2) the guides 3 rest on the base 2a.

6 indicates as an entirety a carrier comprising a frame 6' and a load support, which is later referred to. The frame 6' consists of a bottom wall 6a, side walls 6b, 6b', a top wall 6c and spaced upper and lower panels forming a rear wall 6d. The frame 6' is reinforced vertically by a bar 7 welded to the top and bottom walls thereof and horizontally disposed bars 7a, 7a', each welded at its opposite ends to the vertical bar 7 and one of the side walls 6b, 6b'. By preference, the frame 6' is provided with a front wall 6x, which forms a back for the pre-grouped bodies when the latter are on the load support. The frame 6' may be of any desired width. In the illustrated form of construction, the elevating member 4 consists of the following: 4a indicates spaced, parallelly related brackets mounted on and extending rearwardly from the wall 6d, each bracket being provided with upper and lower laterally extending stud shafts 4b loosely rotatably supporting rollers 8, which roll on the secondary guides 3, to support the elevating member 4 and carrier 6 thereon, whereby these parts may be raised and lowered, by suitable mechanism indicated as an entirety at 9. The raising mechanism 9 herein illustrated is of the fluid operated type and preferably similar in construction and operation to the mechanism shown in Letters Patent No. 2,598,566 to Max Lehmann, dated May 27, 1952, wherein the source of fluid under pressure is supplied to the lower end of a member 9a, mounted on the base 2a. The member 9a slidably supports a plurality of concentrically related cylinders 9b, one of which is operatively connected by chains 10 with the elevating member 4 and operates to raise the latter relative to the guides 3, to a predetermined level, due to the supply of fluid pressure to the member 9a, whereas another cylinder being connected to the secondary guides 3, upon raising of the elevating member 4 endwise of the guides 3, the continued supply of fluid pressure to the member 9a operates to raise the guides 3 and thereby raise the member 4 to a higher level. If desired, the brackets 4a may be fixed to upper and lower cross members and the rear wall 6d detachably mounted thereon, whereby the carrier 6 may be replaced by a carrier having a load support adapted to handle varying types of loads, such form of detachment between a carrier and an elevating member being shown in Letter Patent No. 2,522,128 to Max Lehmann.

The load support shown herein consists of a plurality of relatively movable, parallelly related elongated members, disposed in a horizontal plane and extending outwardly from the frame 6'. In the form of construction shown in Figs. 2, 3, 4, 6 and 6a, the members are related in pairs, three pairs being shown and the members of each pair being designated 11, 11'. As later set forth, one member of each pair may be fixed to the frame 6' and its companion member moved toward and from the fixed member, but as shown, both members 11, 11', of each pair may be simultaneously operated toward or from each other; in either form of construction the opposite sides of spaced parts of a load may be engaged under pressure, respectively, whereby the assembled bodies may be raised and then transported as a unit. The opposed faces of the respective pairs of gripping members 11, 11' (except the outer members 11, 11'), are provided with facings 11x formed of yieldable material, such as rubber or rubber compound (preferably extending from end-to-end of each face). The facings 11x not only provide for frictional engagement of the members 11, 11', with the load parts but being compressed by the members when the latter are operated to engage the load parts, insure a positive gripping relation between the members 11, 11', and the load parts. The inner end of each of the members 11, 11', is provided with an upstanding leg 11a movably mounted on the frame 6'. In the preferred arrangement, such mounting provides for movement of the members of each pair and in the illustrated form of construction it comprises upper and lower guide devices 12, 13, respectively. The devices 13 consist of the following: 13a indicates a guide member disposed adjacent the lower end of the frame 6' and suitably mounted at its opposite ends on the side bars 6b, 6b'. The inner side of each upstanding leg 11a is welded to an elongated sleeve 13c slidably fitting the guide member 13a, the sleeves on the legs 11a being in axial alinement. The guide devices 12 consist of a roller 12a on each leg 11a, having rolling engagement with the rear side of the top wall 6c. Each roller 12a rotates on a bushing 12b which is mounted on a bolt 12c, between a washer 12d and a U-shaped bracket 14. The bracket 14 is fixed to the adjacent leg at the upper end thereof and extends rearwardly therefrom. The bolt 12c extends through and has threaded engagement with the walls of an opening formed in the bracket 14. As will be observed, the guide devices 12, 13, slidably support the members 11, 11', on the frame 6' in a manner which eliminates binding thereof when relatively moved, as later set forth.

The means for simultaneously operating the load gripping members of each pair toward and from each other comprise a power mechanism 15, preferably fluid operated and a movable device 16 having a detachable connection with each leg 11a. The power mechanism 15 consists of a cylinder-piston unit, the outer end of the cylinder 15a being provided with an extension suitably supported between the inner end portions of a pair of plates 15x, the outer ends of which are suitably secured to the side bar 6b' above and spaced from the guide member 13a. The cylinder 15a is provided with a reciprocatable piston 15b, which is connected to the inner end portion of a rod 15c. The outer end of the rod 15c is pivotally connected to the inner end of a block 15', the outer end portion of which is suitably fixed to the rear side of a leg 11a remote from the inner end of the cylinder 15a. The opposite end portions of the cylinder 15a are provided with fluid connections 15d, 15d', to which fluid flow pipes 15e, 15e', respectively, are connected. The flow pipes 15e, 15e', are connected to a suitable valve mechanism (not shown) which is operated by a suitable lever on the truck frame. The fluid (such as oil) is supplied under pressure in a well known manner to either pipe 15e, 15e'. By operation of the lever in one direction, the oil under pressure flows through one pipe for supply to the adjacent end of the cylinder 15a to move the piston 15b toward the opposite end thereof, the oil in the cylinder being discharged through the other pipe to and through the valve mechanism to a sump (not shown); operation of the lever in the opposite direction reverses the fluid connections to the cylinder 15a to move the piston 15b in the opposite direction. By preference, the fluid supply equipment, including the sump, pump, motor for driving the pump and valve mechanism, is of well known form of construction and is mounted on the truck frame 1a, for which reason these parts of the equipment are not shown. The pipe 15e preferably comprises inner sections formed of metallic tubing connected to suitable fittings mounted on the wall 6d and an outer section 15f of flexible hose, whereas the pipe 15e' consists of a flexible hose, both hoses being supported by devices, indicated as an entirety at 15'', to accommodate the movement of the elevating member 4 and carrier upwardly and downwardly.

Figure 3:
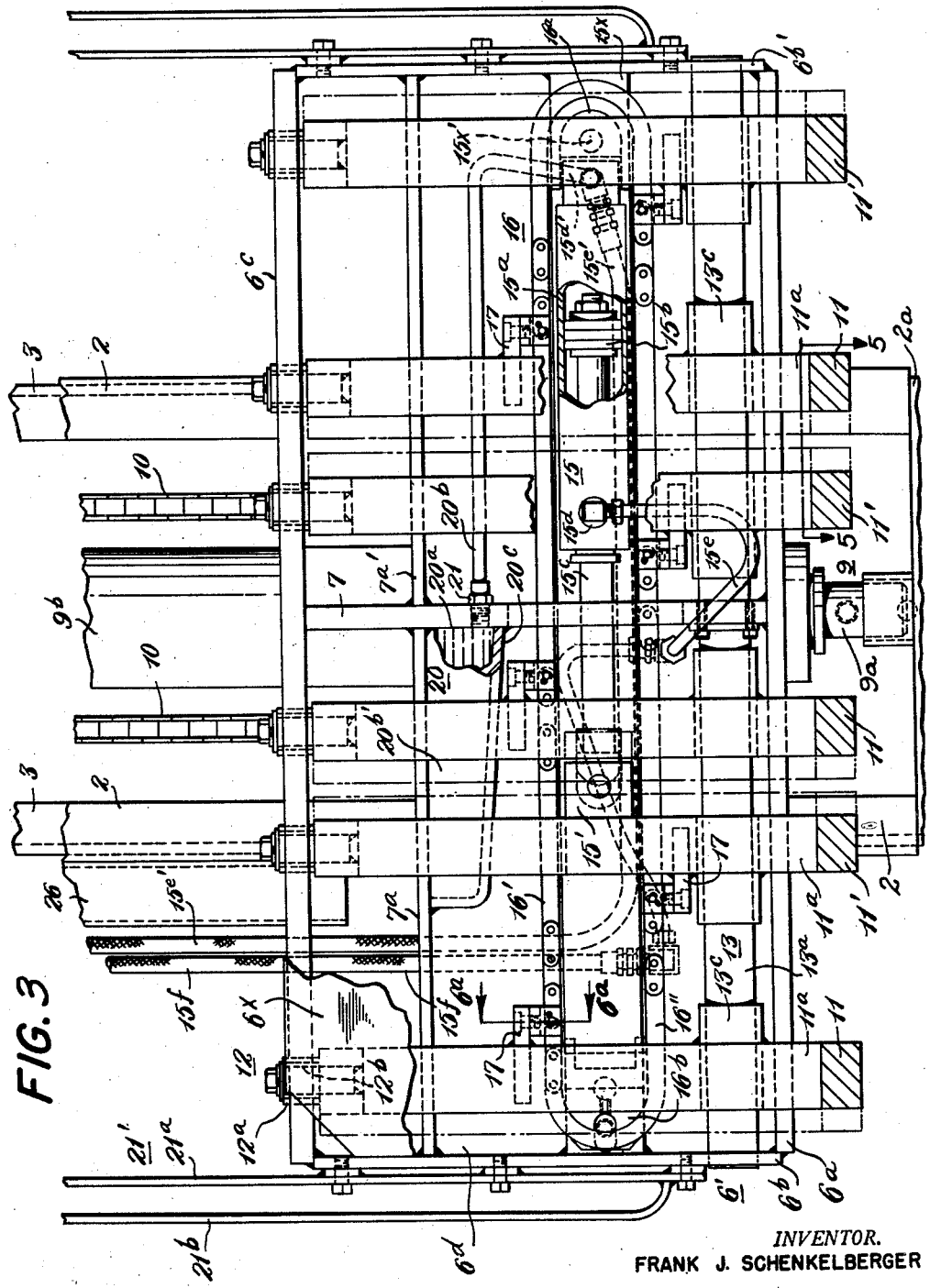
Fig. 3 is a section on the line 3—3 of Fig. 1.

The movable device 16 consists of an endless flexible member, preferably a chain, to which the legs 11a are removably connected, as later set forth. The chain 16 reeves about elements 16a, 16b, the element 16a being disposed between the plates 15x and secured thereto by a pin 15x' extending through alined openings formed in the plates 15x and element 16a. The element 16b is adjustably mounted on the panels forming the rear wall 6d to take up slack in the flexible member 16, the adjustment means being similar to that shown in my co-pending application Ser. No. 221,638, filed April 18, 1951. The connections between the respective legs 11a and the flexible member 16 are similar in construction, so that one only thereof will be referred to as follows: 17 indicates an arm fixed to the rear side of the adjacent leg 11a and extending laterally therefrom toward the adjacent companion leg 11a, in spaced relation to the adjacent run of the flexible member 16. The outer end of each arm 17 is provided with a connector 18, preferably removably connected thereto by a cap screw 17a (see Fig. 6a). The connector 18 is preferably disposed in alinement with the adjacent run of the flexible member 16 and formed with a recess 18a to accommodate the adjacent link thereof, the side bars of which are formed with alined openings, alined with through openings 18b formed in the side walls of the recess 18a, whereby a pin 19, extending through the alined openings, detachably connects the link of the flexible member 16 to the connector 18. The inner end of the pin 19 is provided with a head, whereas its opposite end is formed with an annular groove to receive a clip 19a which co-operates with the head to prevent displacement of the pin 19. The pintle between adjacent links of the flexible member 16 may serve as the pin to connect the connector 18 and flexible member together. It will be observed that since all of the legs 11a are connected to the flexible member 16 and the piston rod 15c is connected to one thereof, supply of fluid pressure to the cylinder 15a to operate the piston 15b in either direction, will move all of the load engaging members 11 in the same direction and simultaneously all of the load engaging members 11' will be moved in the opposite direction, so that the load engaging members 11, 11', of each pair move toward or from each other dependent upon the direction of movement of the piston 15b. Due to the fact that the connections between the legs 11a and the runs of the flexible member 16 are detachable, the legs 11a for the respective pairs of members 11, 11', may be selectively spaced when in their inoperative position, dependent on the thickness of the load part to be engaged by each pair of engaging members. Also, such detachability permits (a) the pairs of members 11, 11', to be relatively spaced dependent on the spacing of the load parts to be engaged or (b) the reduction of the number of pairs of members or an increase in the number thereof within the limit of the frame 6'. In the arrangement of the parts as shown in Fig. 3, the legs 11a of the engaging members 11 are connected to the upper run 16' of the endless member 16, the legs 11a of the engaging members 11' are connected to the lower run 16'' thereof and the piston rod 15b is connected to the leg 11a of one of the members 11'. Accordingly, in the operation of the piston 15a toward the left, as viewed in Fig. 3, the upper run 16' will travel toward the right and the lower run 16'' will travel toward the left, to simultaneously effect movement of the members 11, 11', of each pair toward each other and an engagement of the load parts between them under pressure.

In the alternative arrangement above referred to, the connections between the legs 11a of corresponding engaging members of the pairs thereof are omitted and these legs are connected to the rear wall by a bolt or other device.

20 indicates auxiliary pressure means automatically operable to maintain the pairs of load engaging members 11, 11', in engagement with the load parts to compensate for leakage from the fluid system. The pressure means 20 consist of a closed chamber 20a and a fluid connection 20b connected with the fluid pressure system. The chamber 20a is formed with a front wall 20b' and a bottom wall 20c, its other walls being provided by the upper panel of the wall 6d and the adjacent reinforcing bars 7, 7a. The wall 7 is formed with a screw threaded opening in which a fitting 21 is mounted, the fitting being connected by the pipe 20b with the fitting forming the fluid connection 15d' with the adjacent end of the cylinder 15a. As will be understood when the cylinder 15a and pipes connected thereto are initially filled with fluid, the latter is also supplied through pipe 20b to the chamber 20a, the effect of which is to compress the air therein. When the valve operating lever is operated to supply fluid pressure to the fluid connection 15d' to operate the piston toward the left, as viewed in Fig. 3, the pairs of members 11, 11', are operated to engage the load parts under pressure; simultaneously the compressed air in the chamber exerts pressure on the fluid in the chamber 20a and pipe 20b to supplement the pressure in the cylinder 15a on the outer side of the piston 15b, so that if leakage of the fluid from the cylinder takes place, and/or fittings connecting the chamber 20 therewith, such leakage is compensated for by the auxiliary pressure of the compressed air in the chamber 20a, thereby maintaining the members in load engaging position. The load is then raised and the truck driven to transport the load to the place of discharge. If the quantity of fluid in the chamber 20a and pipe 20b is reduced, it is replenished upon the supply of fluid to the outer end of the cylinder 15a for the succeeding operation of moving the piston 15b toward the left to operate the members 11, 11'.

The back 6x is preferably provided with an extension 21' disposed in the plane of and extending upwardly therefrom. The extension is shown as consisting of inner and outer bars 21a, 21b, suitably connected to each side bar of the frame 6', a cross member 22 fixed to the upper ends of the bars 21a and sides of the bars 21b, a bar 22a connected to the upper ends of the bars 21b and a bar 23 connected to the bars 22, 22a, between their opposite ends.

24 indicates shoes mounted on the intermediate load engaging members 11', 11, respectively. Each shoe consists of a plate 24a (Figs. 4 and 6) arranged to frictionally engage the bottom surfaces of the load, a pair of reversely related U-shaped members 24b, 24c, the top walls of which are spot welded to the plate 24a and a bottom plate 24d which is spot welded to the bottom walls of the U-shaped members 24b, 24c. As shown in Fig. 4, when the members 11, 11', of each pair thereof are in their inoperative position, the position thereof for projection into the spaces between the load parts to be engaged, the member 11' of one pair and the adjoining member 11 of the adjacent pair are seated in the adjacent U-shaped members 24b, 24c, in engagement with the end walls thereof, so that the plate 24a and top walls of the U-shaped members project laterally beyond the facings 11x to protect the latter against damage as the pairs of members 11, 11', are projected into position. Following the positioning of the pairs of engaging members 11, 11', as above set forth, the latter are raised to effect frictional engagement of the plates 24a with respective bottom surfaces of the load between the load parts to be engaged, so that when the members 11, 11', of each pair are moved toward each other to engage the opposite sides of a load part, the plate 24a is maintained in fixed relation to the load surfaces, whereas the members 11, 11', move relative to the inner walls of the U-shaped members as shown in dotted lines in Fig. 4, into gripping relation with the load parts. It will therefore be observed that the relative movement of the members 11, 11', into engagement with the load parts is independent of the bottom surfaces of the load between these parts. The top walls of the outer members 11, 11', are provided with strips 11x' equal to the combined thickness of the plate 24a and top walls of the U-shaped members 24b, 24c. Each intermediate member 11, 11', is provided with a depending pin 25, which extends through a transverse slot formed in the bottom wall of the adjacent U-shaped member and the plate 24d and engages the side walls thereof and co-acts with the pin on the adjoining engaging member to prevent displacement of the adjacent shoe.

In the form of construction herein disclosed, the elevating member 4 and carrier 6 may be raised relative to the guides 3 to the upper end thereof as shown in Fig. 7 and thereafter by raising the guides 3 the elevating member 4 and carrier 6 may be raised to a higher level, as shown in Fig. 8, by fluid pressure supplied to one of the cylinders as already set forth. In carrying out these operations, the mechanism 15" supports the flexible hoses 15e', 15f, and serves to take up and pay out the latter during movement of the elevating member 4 upwardly and downwardly. The mechanism 15" consists of the following: 26 indicates an elongated guide preferably of channel shape in cross section and suitably fixed to the outer side of the adjacent main guide 2. 26a indicates a weight slidably fitting the inner walls of the guide 26 and adapted to counterbalance certain movable parts of the mechanism 15". The lower end portion of the weight 26a is formed with a transverse opening in which the inner end portion of a shaft 26b is mounted; the outer end portion of the shaft supports a pulley 27 between a pair of plates 27a. 28 indicates a pulley disposed above and in alinement with the pulley 27 and rotatable on a shaft 28a supported at its opposite ends on spaced brackets 28b carried by the adjacent guide 3. As shown in Fig. 1a, the pulleys 27, 28, are provided with side-by-side peripheral grooves to accommodate the hoses 15e', 15f. As shown in Fig. 1, when the elevating member 4 is in its low or normal position, the hoses 15e', 15f, extend upwardly around the pulley 28, then downwardly between guide elements 29, 29a, and around the pulley 27 and then upwardly, the outer ends of the hoses being connected to fittings 30 preferably supported on the adjacent guide 2, the fittings 30 in turn being connected by pipes or hoses to the valve for controlling the flow of fluid to and from the cylinder 15a. In operation, when the elevating member 4 is raised to the position shown in Fig. 7, the hoses 15e', 15f, reeve around the pulleys 27, 28, and the weight gravitates downwardly to take up slack therein: when the elevating member 4 is raised to a higher level, as shown in Fig. 8, the weight is moved upwardly and the hoses reeve around the pulleys 27, 28, to pay out of the hoses. No claim is made herein to the take-up and pay-out mechanism, as I believe such mechanism to be the invention of Charles F. Overbeck, of Lakewood, Ohio.

Figs. 1 to 8, inclusive, show the adaptation of the load support to a pre-grouped or pre-assembled body of blocks A of parallelepiped shape, certain of which are disposed in parallelly spaced rows A' on the flooring a. The rows of blocks A form the load parts hereinbefore referred to and, as shown in Fig. 1, the plates 24a, 11x', are in engagement with the bottom surfaces of the stacked blocks A and the opposite sides of the rows A' are engaged by the pairs of members 11, 11', whereas Fig. 7 shows the load support with the stacked blocks A thereon raised relative to the guides 3 and Fig. 8 shows the guides 3 in elevated position with the load support and blocks A thereon positioned at a higher level.

Operation: when a load of pre-grouped blocks or boxes A is to be picked up and transported to a place of discharge, the pairs of members 11, 11', are initially positioned as shown in Fig. 3; next, the truck is driven endwise to project the pairs of members 11, 11', between the rows A' of blocks or boxes A, next the pairs of members 11, 11', are raised to frictionally engage the plates 24a, 11x', with the bottom surfaces of the stacked blocks or boxes between the rows A' and at the outer sides of the outer rows, next the fluid pressure is supplied to the outer end of the cylinder 15a to move the piston 15b toward the left, the effect of which is to simultaneously operate the members 11 toward the right and the members 11' toward the left, whereby each member 11 and its companion member 11' engage the opposite sides of a row A' under pressure, and finally the load carrier 6 is raised and may be tilted inwardly on the trunnions 1d and the load transported to its place of discharge. To discharge the load, these operations are carried out in a reverse order.

Figure 10:
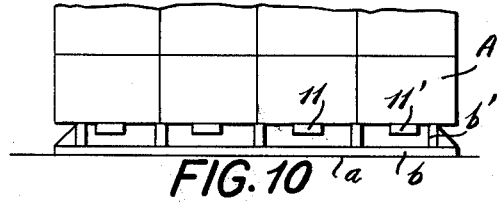
Figure 10A:
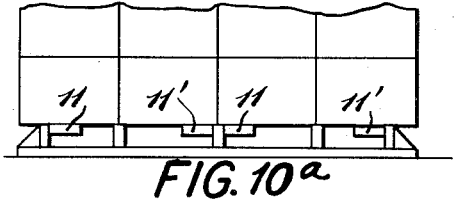
Figure 10B:
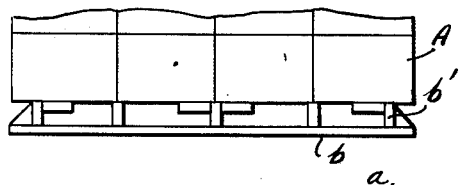
Figure 10C:
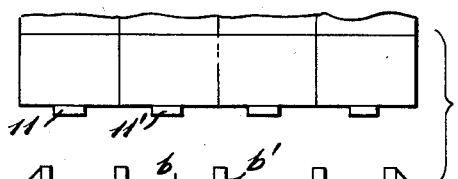
Figure 11:
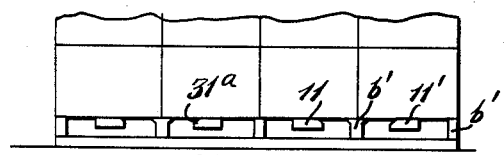
Figure 11A:
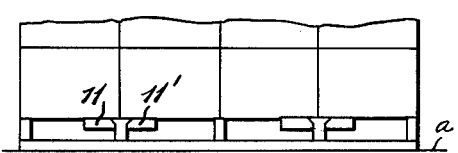
Figure 11B:
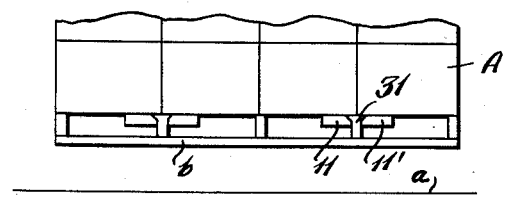
Figure 11C:
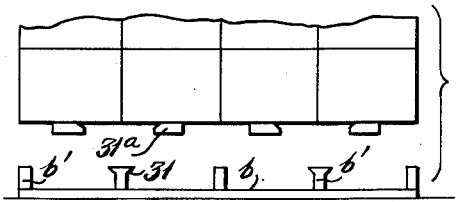

In the foregoing description the load engaging members 11, 11', are so connected to the chain 16 that they are operated from an inoperative position toward each other to engage a load part between them, but as shown in Figs. 10 and 10c, these members may otherwise be connected to the chain whereby they are operated from an inoperative position away from each other.

Figure 9:
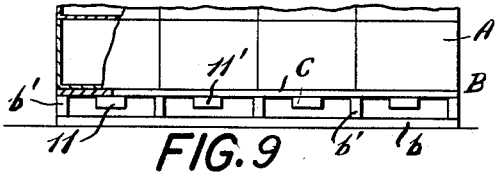
Figs. 9, 9a, 9b and 9c are views diagrammatically illustrating the steps of my improved process.
Figure 9A:
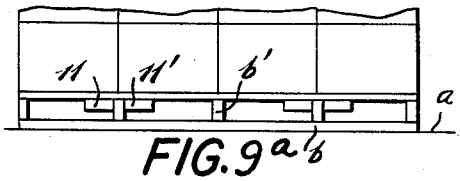
Figure 9B:
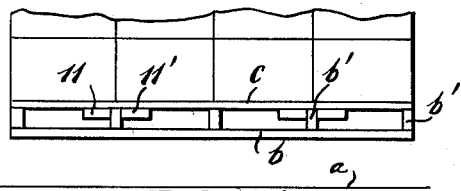
Figure 9C:
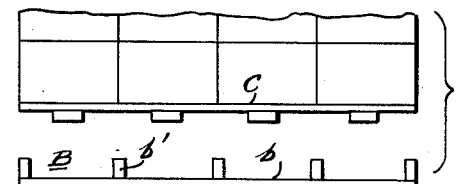

The construction of the carrier 6 herein disclosed lends itself to carrying out a process of handling loads, wherein a support B is employed, the support consisting of a base b having spaced parallel side and intermediate runners b', as shown in Figs. 9 to 9c, inclusive; and certain of the runners provide the load parts (hereinbefore referred to) to be engaged by the pairs of members 11, 11'. Also, by preference, the carrier 6 is provided with a suitable pusher C (see Fig. 9d) to facilitate discharge of the load as later set forth. The pusher C is not illustrated in detail as the construction and operation thereof is well known in this art and any desired form of construction thereof may be mounted on the carrier 6. In carrying out the process the support B may be positioned on the floor a adjacent the delivery or output end of a body fabricating apparatus, for example, a block molding machine, a carton, box or bag filling apparatus. The first step of the process consists of transferring the bodies A to and stacking them on the runners b', as shown in Fig. 9; next, the engaging members 11, 11', of each pair are disposed in inoperative position or relation and projected into the spaces between the runners b' at opposite sides of those runners to be engaged; next, the pairs of members 11, 11', are raised to engage the bottom surfaces of the stacked bodies A (Fig. 9); next, the members 11, 11', of each pair are simultaneously operated toward each other to engage under pressure, the adjacent runner b' (Fig. 9a); next, the stacked bodies A and support B are raised as a unit (Fig. 9b) and transported to the place of discharge and lowered to position the support B on the floor or other surface a; next, the members 11, 11', of each pair are simultaneously moved away from each other to disengage the adjacent runner b'; next, the members 11, 11', are raised to an elevated position, independently of the support B, thereby discharging the support (Fig. 9c) and the load is transported to any desired destination, for discharge onto a storage surface, the flooring of a truck body, cargo plane or freight car by means of the pusher C, as shown in Fig. 9d. From the foregoing description it will be observed that the fabricated bodies may be initially stacked on a support and parts of the latter engaged so that the bodies and support may be transported to one location, the support discharged and thereafter the stacked bodies may be transported to a second location.

The process shown diagrammatically in Figs. 10, 10a, 10b and 10c illustrate steps similar to those shown in Figs. 9, 9a, 9b and 9c, respectively, except in this illustrated process the adjacent engaging members 11, 11', move away from each other to engage the runners b'. Such operation may be carried out by driving the flexible member 16 in a direction to operate the upper run 16' toward the left and the lower run 16" toward the right as viewed in Fig. 3.

The process shown diagrammatically in Figs. 11, 11a, 11b and 11c illustrate steps similar to those shown in Figs. 9, 9a, 9b and 9c, respectively, except that runners b' which are engaged by the members 11, 11', are provided along their sides with shoulders 31 and the members 11, 11', along their opposed sides are formed with recesses at 31a to accommodate the shoulders 31 and provide an interlock between the runners b' and members 11, 11'.

The process lends itself for use where the bodies to be handled consist of cartons or boxes, which may be empty or filled with suitable material, bodies of a fragile type and other types of bodies the length or width of which is equal to the center-to-center spacing of the runners b'. In handling these types of bodies I prefer to mount on the runners a sheet of flat material c, such as cardboard, and stack the bodies thereon.

Fig. 12 shows a modified form of carrier provided with five pairs of engaging members 11, 11'.

To those skilled in the art to which my invention relates, many changes in construction and widely differing embodiments and applications of the invention will suggest themselves without departing from the spirit and scope of the invention. My disclosures and the description herein are purely illustrative and are not intended to be in any sense limiting.

What I claim is:

1. A carrier comprising a frame, adapted to be mounted on the elevating member of a vehicle, and a load support, said support comprising a plurality of members, one member being movable toward another member to engage a part of the load, guide devices between said frame and certain of said members, whereby the latter are slidably supported for movement laterally on said frame, and power mechanism mounted on said frame and comprising a fluid operated motor operatively connected to one of said slidable members and an endless member engaging spaced reeving devices on said frame to provide upper and lower runs extending between the latter, one run of said endless member being connected to another one of said slidable members and, said power mechanism being operable through said endless member to simultaneously move each of said slidable members relatively toward or from the other members, respectively.

2. A carrier comprising a frame, adapted to be mounted on the elevating member of a vehicle, and a load support, said support consisting of a plurality of load engaging members, guide devices between said frame and said members, whereby the latter are slidably supported on said frame for movement laterally, an endless member mounted on spaced reeving devices supported on said frame and arranged to provide between said devices upper and lower runs, certain of said movable members being connected to one run of said endless member for movement in one direction and the other movable members being connected to the other run of said endless member for movement in the opposite direction, and power mechanism mounted on said frame and connected to one of said movable members and operable through said endless member to simultaneously move said movable members into engagement with a load.

3. A carrier comprising a frame, adapted to be mounted on the elevating member of a vehicle, and a load support, said support consisting of a pair of relatively movable members adapted to engage under pressure the opposite sides of a load, guide devices between said frame and said members, whereby the latter are slidably supported on said frame, an endless member movably engaging spaced reeving devices on said frame, to provide transversely extending upper and lower runs between said reeving devices disposed in a horizontal plane intermediate said guide means, one of said members being connected to said upper run and the other member being connected to said lower run, a cylinder, the opposite ends of which are provided with fluid connections, adapted to be connected with a supply of fluid under pressure and fluid discharge system, and a reciprocatable piston in said cylinder operatively connected to one of said members, said latter member operable through said endless member to move said members toward or away from each other, the operation of said members toward each other serving to engage the opposite sides of a load, whereby the latter may be raised.

4. A carrier as claimed in claim 3 wherein the opposed walls of said members are provided with faces formed of compressible material, said faces being substantially co-extensive in length to said opposed walls and adapted to be compressed between the load and said members when the latter are moved into load engaging position.

5. A carrier comprising a frame, adapted to be mounted on the elevating member of a vehicle, and a load support, said support consisting of a pair of relatively movable members adapted to engage under pressure the opposite sides of a load, guide devices between said frame and said members, whereby the latter are slidably supported on said frame, an endless member movably engaging spaced reeving devices on said frame, separate connections between said members and the runs of said endless member, respectively, power mechanism connected to one of said members and operable through said endless member to move said members toward or away from each other, the operation of said members toward each other serving to engage the opposite sides of a load, whereby the latter may be raised, said power mechanism consisting of a cylinder-piston unit adapted to be connected with a valve controlled fluid pressure supply system, said system including an auxiliary pressure means connected to said cylinder at that side of the piston to which fluid pressure is applied to effect movement of said members into engagement with the load and arranged to compensate for fluid leakage from said cylinder or fluid connections therewith.

6. A carrier as claimed in claim 5 wherein said auxiliary pressure means consists of a closed chamber having a fluid connection with said cylinder, the supply of fluid to said cylinder serving to supply fluid to said chamber to compress the air therein, the compressed air serving to supplement the applied pressure to compensate for fluid leakage from said cylinder or said connections.

7. A carrier comprising a frame, adapted to be mounted on the elevating member of a vehicle, and a support for a load having spaced parts, said support consisting of a plurality of pairs of relatively movable members, the members of each pair being movable toward each other to engage the opposite sides of one of the load parts, guide devices between said frame and said members for slidably supporting the latter on said frame, an endless flexible member movably engaging reeving elements on said frame arranged to provide horizontally disposed upper and lower runs extending between said elements, corresponding members of said pairs of members being connected to one run of said flexible member and the other corresponding members being connected to the other run of said flexible member, cylinder-piston elements disposed between the runs of said endless member, said cylinder element being fixedly related to said frame and adapted to be connected to a valve controlled fluid pressure system and said piston element having a rod connected to one of said members to move the latter on said guide devices, the movement of said last mentioned member operating through said flexible member to simultaneously move the members of each pair toward each other to engage under pressure the load parts, whereby the load may be raised, or away from each other to discharge the load.

8. A carrier comprising a frame, adapted to be mounted on the elevating member of a vehicle, and a support for a load having spaced parts, said support consisting of a plurality of pairs of relatively movable members, the members of each pair being movable toward each other to engage the opposite sides of the load parts, guide devices between said frame and said members for slidably supporting the latter on said frame, an endless flexible member movably engaging reeving elements on said frame, corresponding members of said pairs of members being connected to one run of said flexible member and the other corresponding members being connected to the other run of said flexible member, cylinder-piston elements adapted to be connected to a valve controlled fluid pressure system, one of said last mentioned elements being connected to one of said members and operable through said flexible member to simultaneously move said members of each pair toward each other to engage under pressure the load parts, whereby the load may be raised, or away from each other to discharge the load, and a shoe mounted on each member of one pair of members and the adjoining member of the adjacent pair of members and adapted to be interposed between said members and the adjacent bottom surfaces of the load, said members having sliding engagement with the walls of said shoes, whereby said members are movable relative to the load.

9. A carrier for a load having spaced parts, said carrier comprising a frame, adapted to be mounted on the elevating member of a vehicle, and a support consisting of a plurality of movable members disposed in a horizontal plane, said members being arranged to be projected into the spaces between the spaced parts of the load, the load part engaging sides of said members being provided with facings formed of compressible material, guide devices between said frame and said members for slidably supporting the latter on said frame, a shoe mounted on each member and the adjacent members and extending laterally into overlapping relation to the facings on the adjacent members to protect said facings during projection of said members into the spaces between the load parts, an endless member movably mounted on said frame, connections between certain of the members and each run of said endless member, and power mechanism operatively connected to said endless member for simultaneously moving the members of each pair toward each other to compress said facings and grip the opposite sides of the load parts.

References Cited in the file of this patent

UNITED STATES PATENTS

| | | |
|---|---|---|
| 1,221,765 | Penfield | Apr. 3, 1917 |
| 1,498,555 | Langan | June 24, 1924 |
| 1,518,561 | Carroll | Dec. 9, 1924 |
| 2,403,356 | Francis | July 2, 1946 |
| 2,451,943 | Gunning | Oct. 19, 1948 |
| 2,509,682 | Golrick | May 30, 1950 |
| 2,527,103 | Noack et al. | Oct. 24, 1950 |
| 2,601,933 | Seagraves et al. | July 1, 1952 |
| 2,613,830 | Ponnequin | Oct. 14, 1952 |
| 2,663,443 | Schenkelberger | Dec. 22, 1953 |

FOREIGN PATENTS

| | | |
|---|---|---|
| 633,180 | Great Britain | Dec. 12, 1949 |